United States Patent

[11] 3,587,285

| [72] | Inventor | Ricardo Gonzalez<br>Milwaukie, Oreg. |
|------|----------|--------------------------------------|
| [21] | Appl. No. | 766,907 |
| [22] | Filed | Oct. 11, 1968 |
| [45] | Patented | June 28, 1971<br>Continuation-in-part of application Ser. No. 699,746, July 24, 1967, now abandoned, which is a division of application Ser. No. 431,054, Feb. 8, 1965, now Patent No. 3,415,414. |
| [73] | Assignee | Omark Industries, Inc., Portland, Oreg. |

[54] METHOD OF FORMING WELDING STUDS FROM SHEET-LIKE MATERIAL
10 Claims, 6 Drawing Figs.

[52] U.S. Cl. ..................................... 72/379,
113/120, 10/86
[51] Int. Cl. ..................................... B21c 37/02
[50] Field of Search............................. 113/120
(J), 1 (J); 72/348, 349, 405, 412, 414, 415, 475, 377, 379 (X), 352, 354, 358 (X); 10/86 (F); 220/91; 29/630 (C), 522; 219/98, 99

[56] References Cited
UNITED STATES PATENTS

| 634,764 | 10/1899 | Richter.................. | 10/86C |
| 1,005,980 | 10/1911 | Katzinger................. | 72/379 |
| 1,171,702 | 2/1916 | Carlson..................... | 10/86C |
| 1,173,793 | 2/1916 | George..................... | 72/348 |
| 1,439,352 | 12/1922 | Ash et al.................. | 72/379 |
| 1,774,824 | 9/1930 | Dow et al.................. | 72/377 |
| 1,784,256 | 12/1930 | Stout....................... | 29/522 |
| 1,837,720 | 12/1931 | Luce et al................. | 10/86C |
| 2,312,749 | 3/1943 | Bullock.................... | 72/348 |
| 2,760,263 | 8/1956 | Geertsen................... | 10/86CI |

FOREIGN PATENTS

| 2,259 | 7/1953 | Germany................... | 72/343 |

*Primary Examiner*—Richard J. Herbst
*Attorney*—Charles F. Duffield

ABSTRACT: The method of working the surface of a substantially flat metallic member to make it suitable for high current density welding to a similar flat surface which includes forming, by impact extrusion, a discrete and finite weld base area on the surface of the metallic member characterized by a frustoconical weld base area having a sharp peripheral edge and an extended welding tip disposed axially of the frustoconical base. The flat metallic member may initially be deep drawn to form a cuplike member prior to the extrusion process forming the weld base area. In particular embodiments, the cup-shaped member may be internally threaded or an external flange formed thereon to provide additional fastener means for the stud.

PATENTED JUN 28 1971

INVENTOR.
Ricardo Gonzalez
BY
Charles F Duffield
ATTORNEY.

METHOD OF FORMING WELDING STUDS FROM SHEET-LIKE MATERIAL

SUMMARY AND OBJECTS OF INVENTION

The present invention applies to a method of forming welding studs and, more particularly, to a method of forming welding studs from relatively thin sheet metal, and is a continuation-in-part of application Ser. No. 699,746 filed July 24, 1967 now abandoned, which is a division of application Ser. No. 431,054 filed Feb. 8, 1965, now U.S. Pat. No. 3,415,411.

Electric stud welding is a welding process for securing metallic fasteners and the like to a supporting surface and is a relatively new process. In this process, a fastener such as a stud is, generally speaking, brought into contact with the metal to which it is welded and an electric current of an extremely high density passed through the stud. The resultant current discharge through the stud and the piece to which it is welded will heat the contiguous portions of the stud and the workpiece to temperatures above the melting point of the two members with the resulting fusion bonding of the two members together.

The electric current employed may be supplied from many sources including batteries, rectified industrial power supplies, and stored energy sources such as capacitors. All of these power supplies are capable of supplying the relatively large current in an extremely short interval time, i.e. in terms of milliseconds. Due to the extremely short time in which the weld is effected and the temperatures involved, the configuration of the weld base area of the stud is extremely important.

The exact configuration of the weld base area will differ somewhat depending on the welding process and power supply used. Generally, it has been found that a slightly frustoconical weld base is desirable to control the rate of radial expansion of the resultant arc. In many applications, the edge of the weld base area must be sharp to control the extent to which the weld will progress. In applications where a capacitor is employed as the power source, a discrete projection above the weld base improves the weld. The projection disintegrates upon the high current being applied to the stud and forms a low resistance ionized path for the subsequent current discharge.

Thus, the critical weld base area requires that the studs be manufactured by a process which can maintain the requisite accuracy of the weld base.

In the past, only manufacturing processes employing rod or bar stock have been successful in producing sufficiently accurate studs. The manufacturing process using rod or bar stock can be carried out in a number of ways. One such method is turning the studs on a screw machine so as to form the stud body and the special weld base configuration necessary at the end of the stud.

Another method of forming studs from rod or bar stock is that of cold heading. In this process, the rod or bar stock is advanced in a cold heading machine and the weld base configuration is formed by cold flowing the stud metal as the piece of rod or bar stock is formed in the closed dies of the heading machine.

The screw machine and heading processes are suitable only for producing elongated studs which are suitable for point contact with the workpiece to which they are to be attached. The studs which can be produced by these processes are also limited generally to symmetrical geometric configurations. Lastly, the screw machine and heading processes are expensive and time consuming due to the use of solid material in the rod or bar stock and to the inherent speed limitations of the machines employed.

In contrast, the stud manufacturing process of the present invention is based upon a new concept which has heretofore never been employed. This new process, while permitting the manufacture of elongated studs, also permits manufacturing of very accurate studs of a much wider variety, i.e., studs of substantially flat configuration or studs having irregular and asymmetrical portions.

In distinction to the solid rod or bar stock heretofore used, the new process employs relatively thin sheet metal. The sheet metal is passed under a punch or blanking die which blanks the rough form of stud desired, i.e. flat, concave, etc. The blanked member is then impact extruded at selected points on its surface to provide accurate and discrete weld base areas at the selected points. The finished stud may then be stud welded to a workpiece of complimentary configuration which will result in the stud being welded to the workpiece at each of the extruded weld base areas.

As a further part of the process, if a stud of an elongated configuration is desired, the blanked member is deep drawn to form the elongated stud prior to the impact extrusion process for forming the discrete and finite weld base area of the stud.

The stud manufacturing process of the present invention should not be confused with metallic members which, in the past, have been used in conjunction with spot welding techniques. In this earlier technique, a sheet metal member is blanked and stamped to provide raised portions on the member at which a spot welding machine is applied to weld the member to a surface. These members are simply bent, without any appreciable metal flow, to the desired configuration and the welding area configuration is of no particular concern. In distinction, in the present process the weld base area is extruded resulting in appreciable metal flow to form a very accurate, discrete and controlled configuration of weld base area which is absolutely necessary in the stud welding process as known today. Likewise, the stud body is, in many cases, deep drawn to form the desired stud configuration.

Other objects and meritorious features of the present invention will be apparent from the detailed description thereof which follows.

DETAILED DESCRIPTION OF INVENTION

Figure 1:
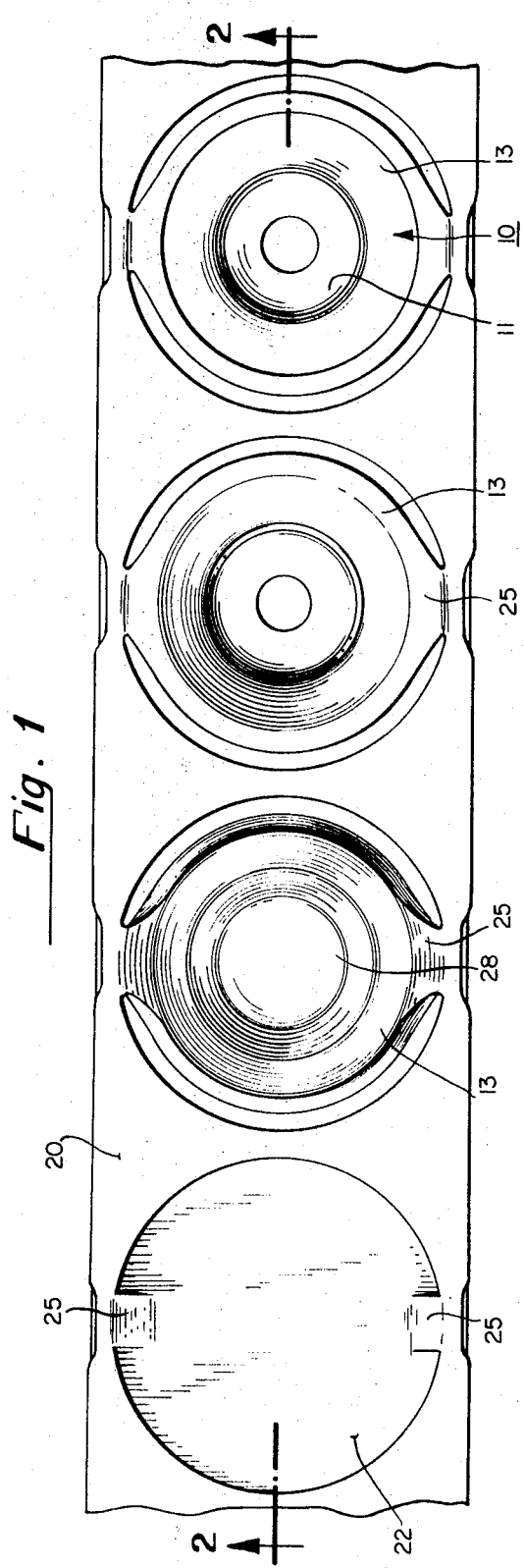
FIG. 1 is a top plan view of a strip of sheet metal in which a stud is being formed according to the present invention.
Figure 2:
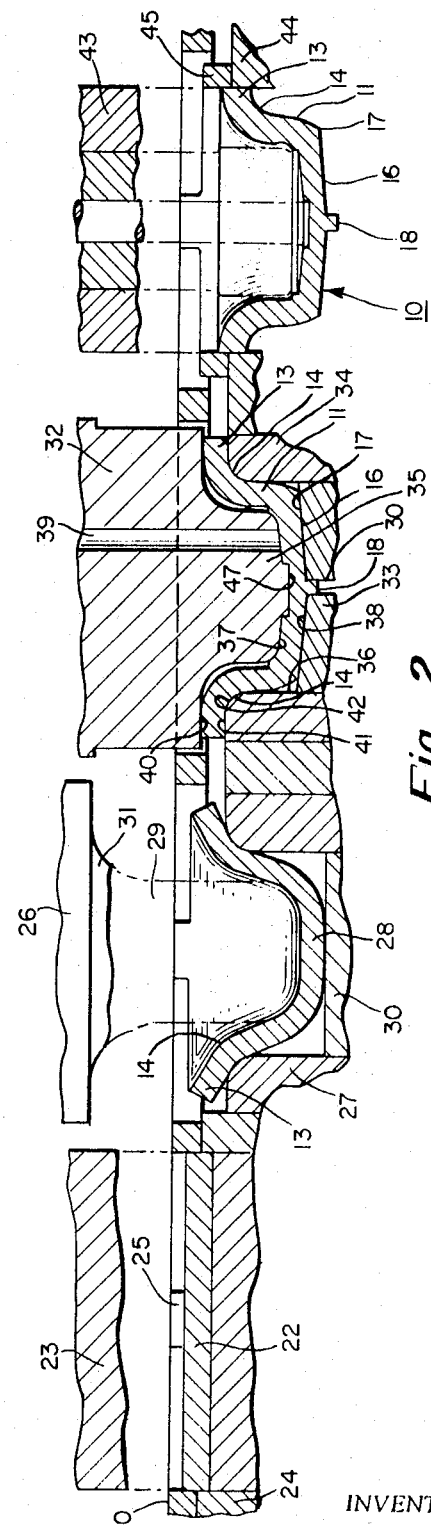
FIG. 2 is a side elevation showing the progressive formation of the stud of FIG. 1 according to the present invention.

The method of forming studs, in accordance with one embodiment of the present invention, may be seen from FIGS. 1 and 2 of the drawings. A strip 20 of drawing grade, cold rolled sheet metal such as, for example, mild steel, is advanced step by step, through the dies of a multistage punch press. In the first stage of the press, a drawable disc-shaped blank 22 is cut by punch and die members 23 and 24 from the strip except for carrying webs 25. The carrying webs 25 permit the blank to contract in diameter as it is drawn during the second stage of the process but maintain the blank in place throughout the completion of the forming process.

In the second stage, the central portion of the blank is drawn by opposed die members 26 and 27 into a deep dimple or cup 28 with a flange 13 thereon started. The die member 26 has a cylindrical shank portion 29 of a diameter substantially less than the inner-diameter of the die member 27. As the die member 26 advances, the central portion of the blank is drawn downwardly into the die member 27 until a spring loaded plunger or stop member 30 is reached.

The upper end of the die member 27 has a rounded inner-edge portion 31 against which the outer edge portion of the blank is pressed and formed partially into the fillet 14 during the drawing step.

In the third stage of the forming operation, the drawing of the body portion of the stud is completed and the weld base of the stud formed by impact extrusion. The drawing process is completed in the third stage by action of a punch member 32 and its corresponding mating die member 34 which, when closed, finish the formation of the cylindrical shank portion 11 of the stud and flatten the flange 13. The lower end portion 35 of the punch member 32 is generally cylindrical and slightly tapered to permit release of the die member from the stud after the die member has formed the substantially cylindrical shank portion 11 of the stud against the cylindrical inner portion 36 of the corresponding die member 34.

An annular shoulder 40 on the punch member 32 and a flat outer portion 41 of the upper end of the die member 34, press against opposite sides of the flange 13 to flatten the flange 13 and, as well, a round inner portion 42 of the upper end of the die member 34 serves to form a fillet 14 on the stud as the members 32 and 34 further draw and form the blank 22.

Simultaneously with the completion of the drawing during the third step, the weld base geometry of the stud is formed. This is accomplished by impact extruding the drawn cup between the lower end 37 of the punch 32 and the die member 33 which is formed to the desired weld base geometry.

As the lower face 37 of the punch member 32 strikes the bottom of the drawn cup, the resultant impact will cause the metal in the bottom of the stud to extrude outwardly from the center of the punch member 32 along the frustoconical face 38 of the die member 33 toward the outer edge thereof. This outward flow of the metal will leave a frustoconical base 16 with a sharp corner 17 at the edge of the welding base of the stud, which are important features as hereinafter described. As the frustoconical base is being extruded, a welding tip 18 is also extruded through an aperture 30 formed in the face of the die member 33. The extrusion of the welding tip 18 into the aperture 30 is enhanced by a projection 47 on the lower end of the punch member 32 which creates added pressure in the central bottom part of the cup.

An ejector passage 39 from an air pressure source is provided for stripping the stud from the punch member 32 following the drawing and extruding process.

In the fourth step of the process, the formed stud 10 is cut completely from the blank 22 by punch and die members 43 and 44 to leave an annular trim 45 in the strip.

Figure 3:
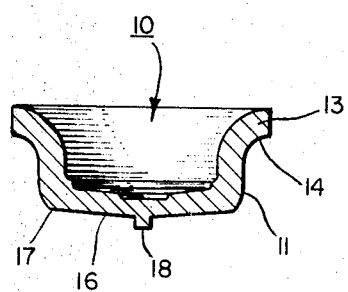
FIG. 3 is sectional view of a completes stud formed according to the method of FIGS. 1 and 2.

The resultant stud formed by the method of FIGS. 1 and 2 is shown in FIG. 3. This stud has many uses, primarily as a fastener. For example, the stud, once welded to a flat surface, may be used to retain such items as automobile trim on car bodies and the like, or trim on appliances, etc., wherein the upper flange 13 provides the locking means.

While the stud 10 has been shown in the embodiment of FIG. 3 as being round, it will be readily understood that the body of the stud may be drawn in any given configuration i.e., elliptical or square, depending upon the application for which the stud is desired.

Figure 4:
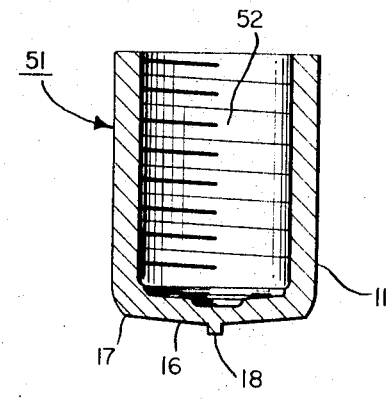
FIG. 4 is a sectional view of an alternate stud formed according to the present invention.

The method of making studs as shown in FIGS. 1 and 2 may also be utilized to make a stud of the nature shown in FIG. 4. In the stud 51 shown in FIG. 4, the flange on the upper end thereof is dispensed with but, instead, the inside walls of the stud include threads 52. The weld base geometry of the stud of FIG. 4 may be formed by the impact extrusion process in the identical way of the stud shown in FIG. 3.

Figure 5:
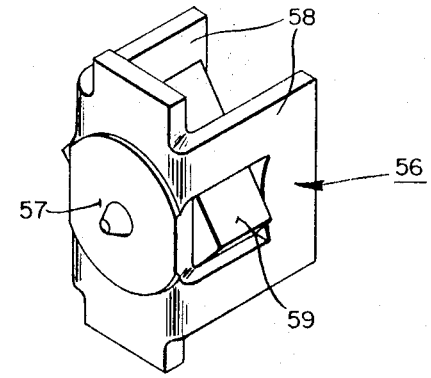
FIG. 5 is a perspective view of a further embodiment of stud manufacture according to the present invention.

The process of forming the critical weld base geometry of studs from sheet metal may also be applied to making studs from sheet metal in the absence of the deep drawing operation. An example of such a stud is shown in FIG. 5. The stud 56 is blanked from sheet metal and the weld base 57 thereof impact extruded as in the case of the studs of FIGS. 3 and 4. The arms 58 of the stud may be appropriately bent in a stage of the operation and a nut 59 caged or locked therein.

A stud of this nature has found application in the household goods industry where the stud is welded to a cooking utensil and a handle secured to the utensil by threading into the nut 59.

Figure 6:
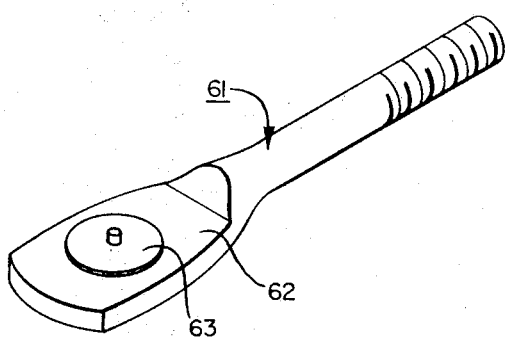
FIG. 6 is a perspective view of yet another form of stud which may be made according to the present invention.

In FIG. 6 there is shown a further example of a stud that may be made in accordance with the method of the present invention. The stud 61 may be initially formed of round stock material, one end 62 of which has been flattened to provide a wide weld base area. This flattened area 62 is processed in accordance with the process of the present invention to provide the critical weld base area 63 thereon as in the case of the studs of FIGS. 3, 4, and 5. A stud of this nature may then be welded, by its flat end, to a substantially flat surface to provide an extremely strong joint. Studs of this nature have found use in the automotive industry as anchoring means for the housings of speedometers for automobiles.

Research and development into the weld base geometry of the studs, formed from sheet metal, has revealed a number of relationships which must be maintained during the impact extruding process of forming the stud. For mild and stainless steels, the welding tip diameter and the length of the welding tip both must be maintained within the range of 5 to 15 percent of the weld base diameter. For aluminum and copper alloys, the tip diameter and length must be maintained within the range of 5 to 25 percent of the weld base diameter.

The thickness of the material to the weld base diameter is also a critical factor. For material in the range of 0.030 inches thickness to 0.060 inches thickness, the weld base diameter is maintained at approximately 0.300 inches or approximately 5 times the thickness of the material. For material between 0.020 inches and 0.030 inches thickness, the weld base diameter is maintained at 0.250 inches diameter of approximately 8 times the thickness of the material. For material below 0.020 inches thickness, a weld base diameter of 0.200 inches is maintained approximately 10 times the thickness of the material.

In the drawing part of the process, for mild and stainless steel, reductions of from 5 to 25 percent have been found acceptable and, for aluminum and copper base alloys, 5 to 50 percent reductions are permissible.

The most preferable slope for the frustoconical weld base has been determined to be about 4° from horizontal. However, in some applications, this may vary from horizontal to about 8° from horizontal.

The foregoing relationships have, through research and development, been found to be accurate in nearly all applications. However, it will be appreciated that some applications will exist or may be subsequently developed which may be outside these limits but still be within the scope and spirit of the invention. As techniques develop, the configuration of the welding tip may be altered, diminished or even eliminated without departing from the invention.

Accordingly it is to be understood that the description of the present invention has been made in respect to particular embodiments thereof and no limitation is thereby intended and the scope of the invention is to be defined by the appended claims.

I claim:

1. The method of forming a fastening device from sheet material which fastening device includes a special configuration thereon adapted for capacitor discharge stud welding of the fastener to a substantially flat member comprising;
    forming a portion of a relatively thin metallic member into a raised wall portion terminating in an end portion,
    coining substantially the entire area of the end portion to form a dimensionally controlled weld base area terminating in a sharp parametral edge portion forming an angle with the wall portion between substantially a right angle and an obtuse angle, and
    impacting the central portion of the end portion between a punch and extrusion die to extrude a solid extended welding tip above the weld base area.

2. The method of claim 1 wherein the raised wall portion of the fastener is formed by the step of deep drawing the relatively thin metallic member.

3. The method of claim 2 further including the step of forming a flange on the end of the wall portion opposite the weld base area to provide the fastening device with a retaining edge.

4. The method of claim 2 further including the step of forming internal threads within the wall portion to provide the fastening device with internal securing means.

5. The method of claim 1 in which the weld base area is coined between horizontal and a frustoconical slope of 8° from horizontal.

6. The method of claim 1 in which the weld base area is substantially round and in which the welding tip is extruded to a height above the weld base area within the range of 5 to 25 percent of the diameter of the weld base area.

7. The method of claim 1 in which the weld base area is substantially round and in which the welding tip is extruded to a diameter within the range of 5 to 25 percent of the diameter of the weld base area.

8. The method of claim 1 in which the weld base area is substantially round and is extruded to a diameter within the range of 5 to 10 times the thickness of the metallic member.

9. The method of claim 1 in which the welding tip is extruded to a length of from 5 to 25 percent of the width of the weld base.

10. The method of claim 1 in which the welding tip is round and is extruded to a diameter of from 5 to 25 percent of the width of the weld base.